April 1, 1958    C. H. NYSTROM ET AL    2,828,728
FUEL INJECTION SYSTEMS
Original Filed Feb. 17, 1954    12 Sheets-Sheet 1

INVENTORS.
CARL H. NYSTROM
EDWARD M. BACH
ARTHUR E. HUSE
BY
Raymond A. Paquin
ATTORNEY April 1, 1958     C. H. NYSTROM ET AL     2,828,728
FUEL INJECTION SYSTEMS Original Filed Feb. 17, 1954     12 Sheets-Sheet 3

INVENTORS.
CARL H. NYSTROM
EDWARD M. BACH
ARTHUR E. HUSE
BY
Raymond A. Paquin
ATTORNEY.

April 1, 1958 C. H. NYSTROM ET AL 2,828,728
FUEL INJECTION SYSTEMS
Original Filed Feb. 17, 1954 12 Sheets-Sheet 4
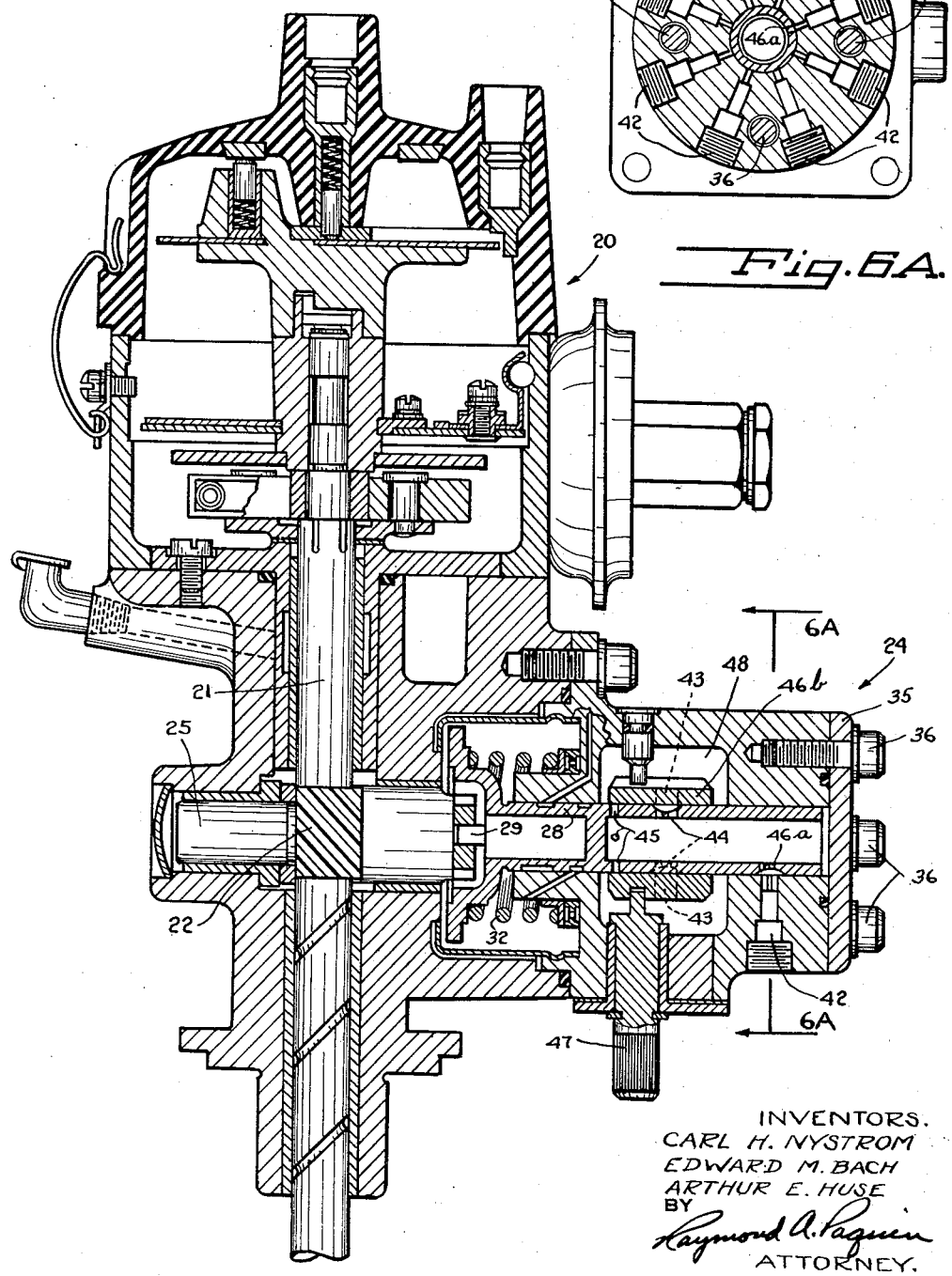
INVENTORS.
CARL H. NYSTROM
EDWARD M. BACH
ARTHUR E. HUSE
BY
Raymond A. Paquin
ATTORNEY.

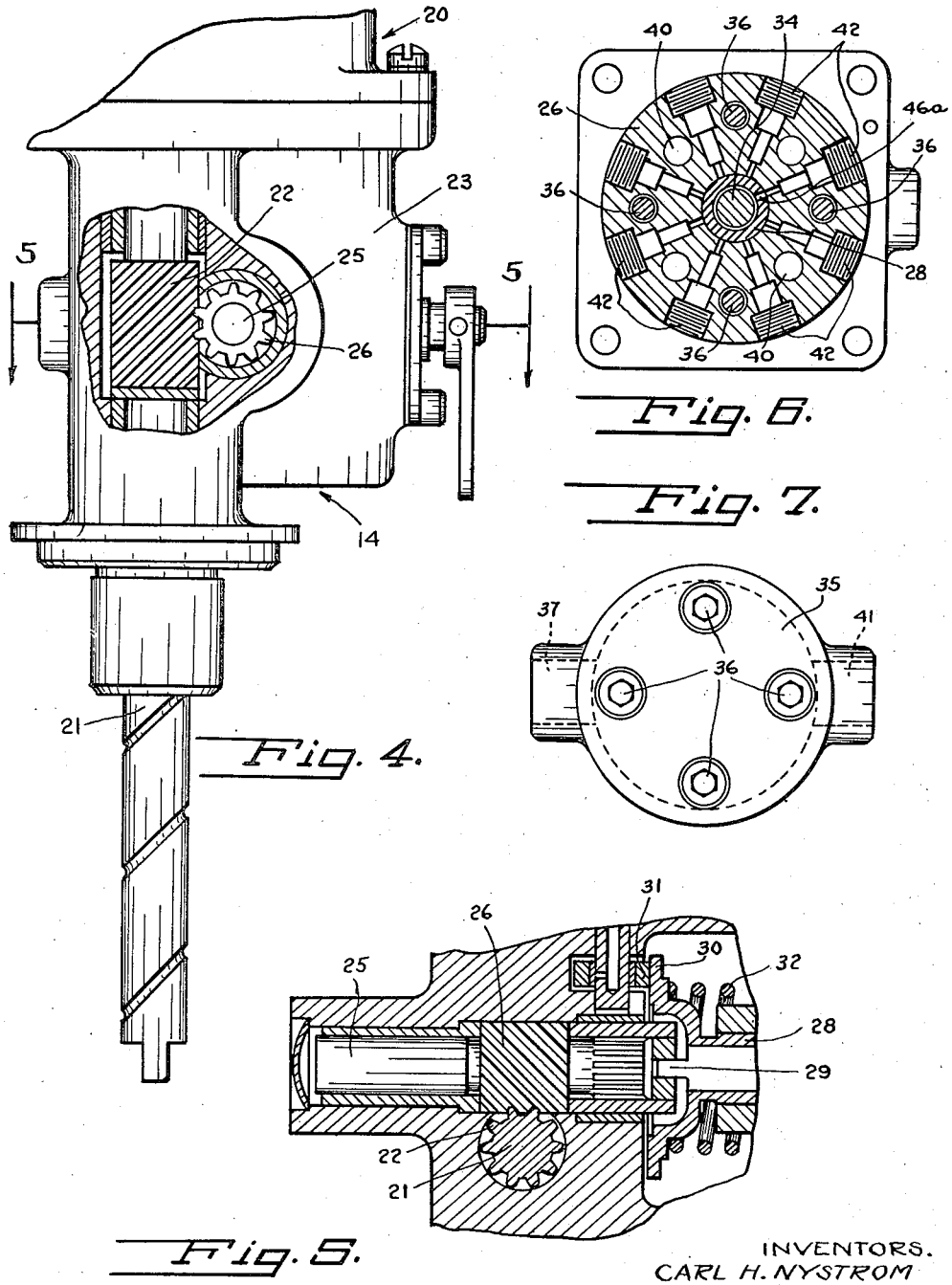

INVENTORS.
CARL H. NYSTROM
EDWARD M. BACH
ARTHUR E. HUSE
BY
ATTORNEY.

April 1, 1958 C. H. NYSTROM ET AL 2,828,728
FUEL INJECTION SYSTEMS
Original Filed Feb. 17, 1954 12 Sheets-Sheet 7

INVENTORS.
CARL H. NYSTROM
EDWARD M. BACH
ARTHUR E. HUSE
BY
Raymond A. Paquin
ATTORNEY.

April 1, 1958 C. H. NYSTROM ET AL 2,828,728
FUEL INJECTION SYSTEMS
Original Filed Feb. 17, 1954 12 Sheets-Sheet 9

INVENTORS.
CARL H. NYSTROM
EDWARD M. BACH
ARTHUR E. HUSE
BY
Raymond A. Paquin
ATTORNEY.

April 1, 1958     C. H. NYSTROM ET AL     2,828,728
FUEL INJECTION SYSTEMS

Original Filed Feb. 17, 1954     12 Sheets—Sheet 10

INVENTORS.
CARL H. NYSTROM
EDWARD M. BACH
ARTHUR E. HUSE
BY
Raymond A. Paquin
ATTORNEY.

April 1, 1958  C. H. NYSTROM ET AL  2,828,728
FUEL INJECTION SYSTEMS

Original Filed Feb. 17, 1954  12 Sheets-Sheet 11

INVENTORS.
CARL H. NYSTROM
EDWARD M. BACH
ARTHUR E. HUSE
BY
Raymond A. Paquin
ATTORNEY.

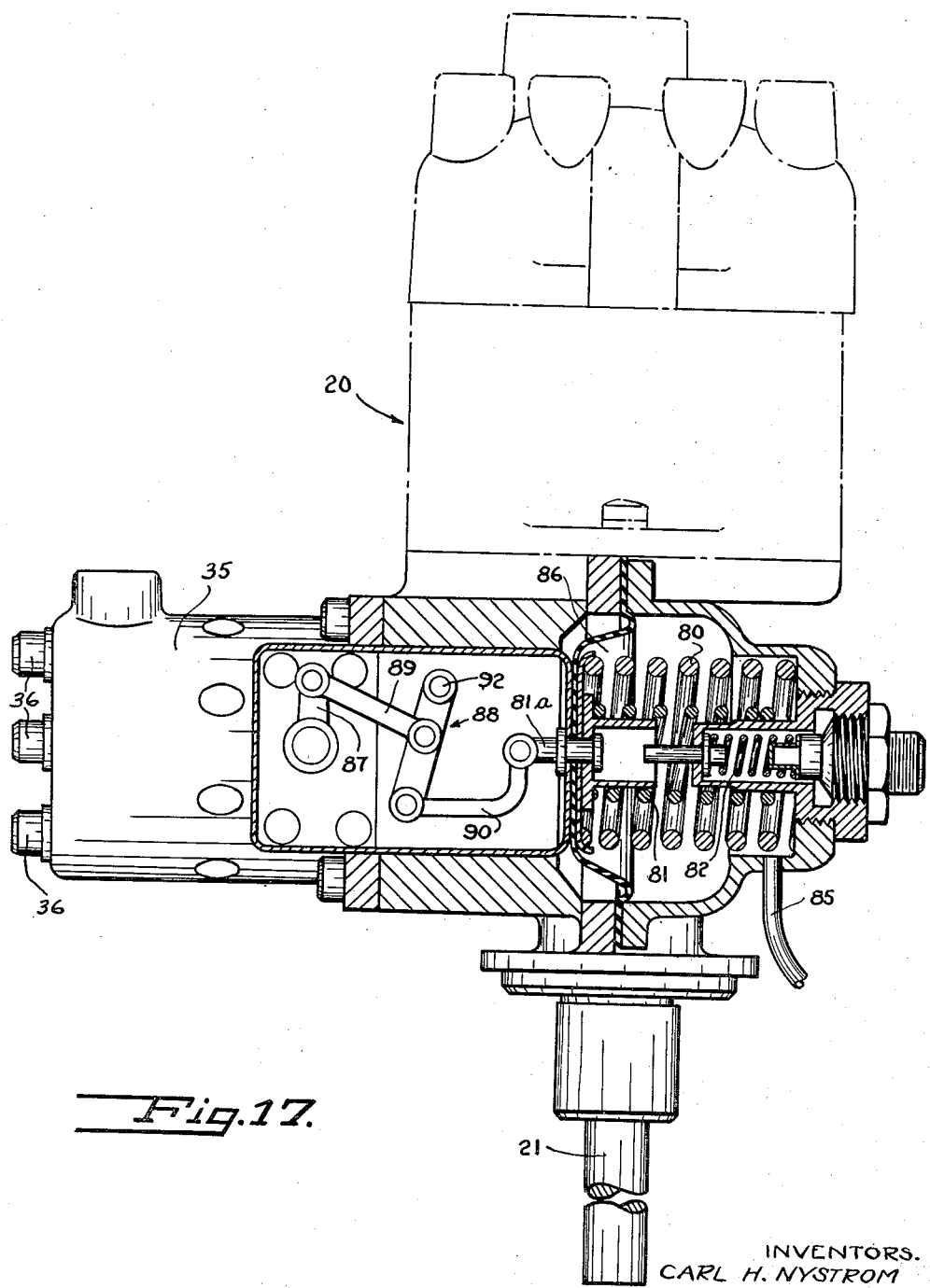

United States Patent Office 2,828,728
Patented Apr. 1, 1958

2,828,728

FUEL INJECTION SYSTEMS

Carl H. Nystrom, West Springfield, Edward M. Bach, Longmeadow, and Arthur E. Huse, Springfield, Mass., assignors to American Bosch Arma Corporation, a corporation of New York Original application February 17, 1954, Serial No. 410,908, now Patent No. 2,772,668, dated December 4, 1956. Divided and this application April 22, 1955, Serial No. 503,072

2 Claims. (Cl. 123—140)

This invention relates to a new and improved fuel injection system for use with spark ignition internal combustion engines and also to a new and improved fuel injection pump, combined injection pump and ignition distributor and mixture control adapted to be employed in such system.

This application is a division of our application Serial Number 410,908, filed February 17, 1954, now Patent No. 2,772,668 issued Dec. 4, 1956.

An object of the invention is to provide a new and improved fuel injection system for use with spark ignition internal combustion engines.

Another object is to provide a new and improved fuel injection pump for use in such systems.

Another object is to provide new and improved means for operably connecting the fuel injection pump to the drive means for the ignition distributor whereby the ignition distributor and injection pump are driven by the same engine drive means.

Another object is to provide a new and improved mixture control for an injection system of the type set forth.

Another object is to provide a combined injection pump and ignition distributor unit wherein the injection pump can be connected to or disconnected from the distributor unit without disturbing the ignition timing.

Other objects and advantages of the invention will be apparent from the following description taken in connection with the accompanying drawings. It will be understood that changes may be made in the details of construction and arrangement of parts without departing from the spirit of the invention, as the preferred forms have been given by way of illustration only.

Referring to the drawings:

Fig. 3a is a view similar to Fig. 3, but showing a modified form of combined injection pump and ignition distributor;

Fig. 4 is a fragmentary side view, partly in section, of the apparatus shown in Figs. 3 and 3a;

Fig. 5 is a fragmentary sectional view taken on line 5—5 of Fig. 4, looking in the direction of the arrows;

Fig. 6 is a sectional view taken on line 6—6 of Fig. 3, looking in the direction of the arrows;

Fig. 6a is a sectional view taken on line 6a—6a of Fig. 3a, looking in the direction of the arrows;

Fig. 7 is an end view of the injection pump shown in Figs. 3 and 3a;

Fig. 17 is a sectional view taken on line 17—17 of Fig. 16.

Figure 1:
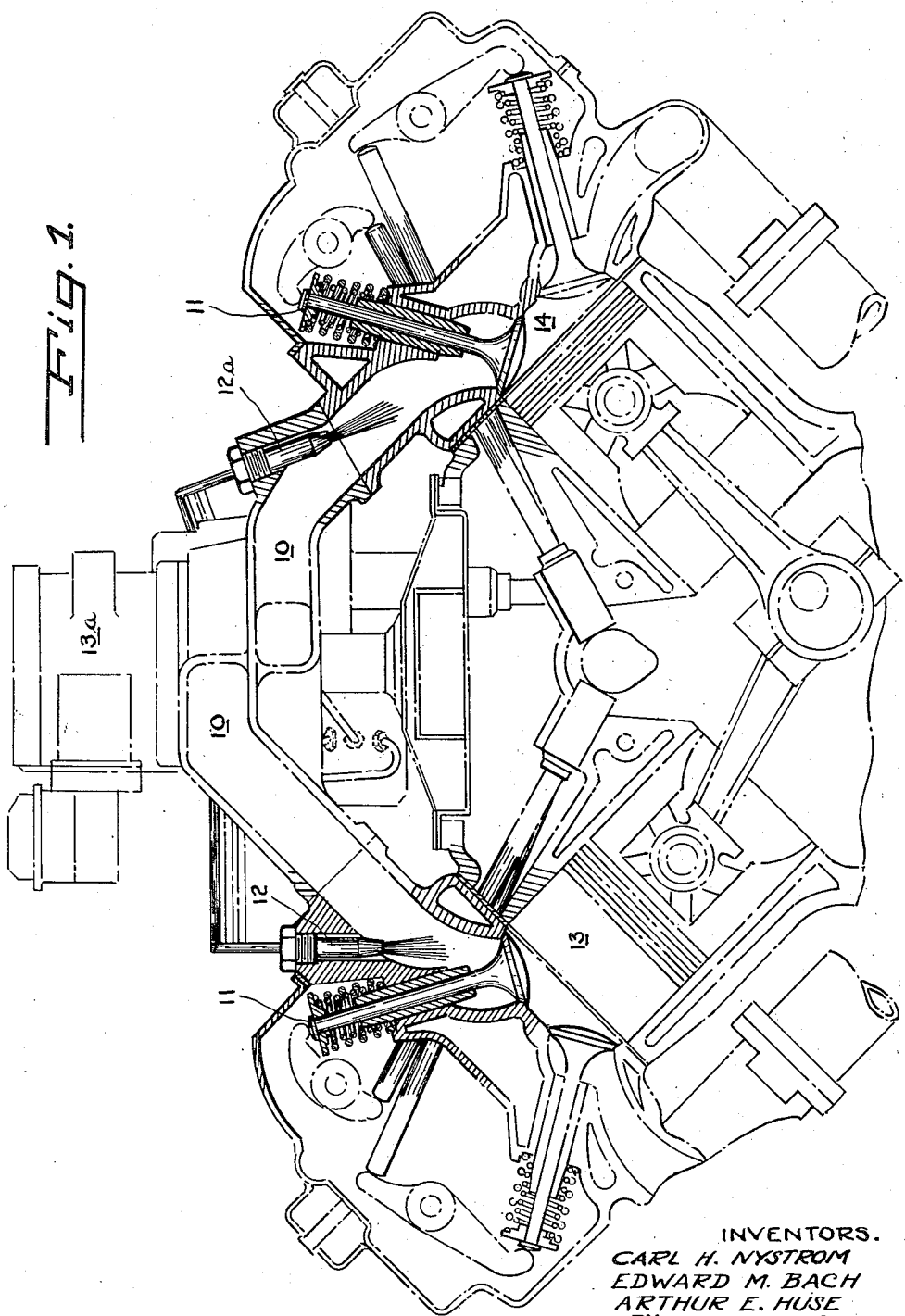
Fig. 1 is a sectional view of an engine embodying the invention.

Referring more particularly to the drawings, the engine shown in Fig. 1 comprises the manifold 10 and the inlet valves 11 and injection nozzles 12 and 12a.

The engine shown is of the V type with the combustion chambers 13 and 14 and the inlet valves 11 control the admission of fuel and air to said combustion chambers from the manifold 10.

It will be noted that the injection valve 12 is shown located much closer to its inlet valve 11 than is the injection nozzle 12a. It is pointed out that the injection nozzle should be as close to its inlet valve as possible in order that the fuel atomized by the nozzle plus air flow plus heat of vaporization of the fuel from the injection nozzle coming into contact with the hot inlet valve all makes for a more homogeneous mixture which results in smoother engine performance and lower fuel consumption.

Figure 2:
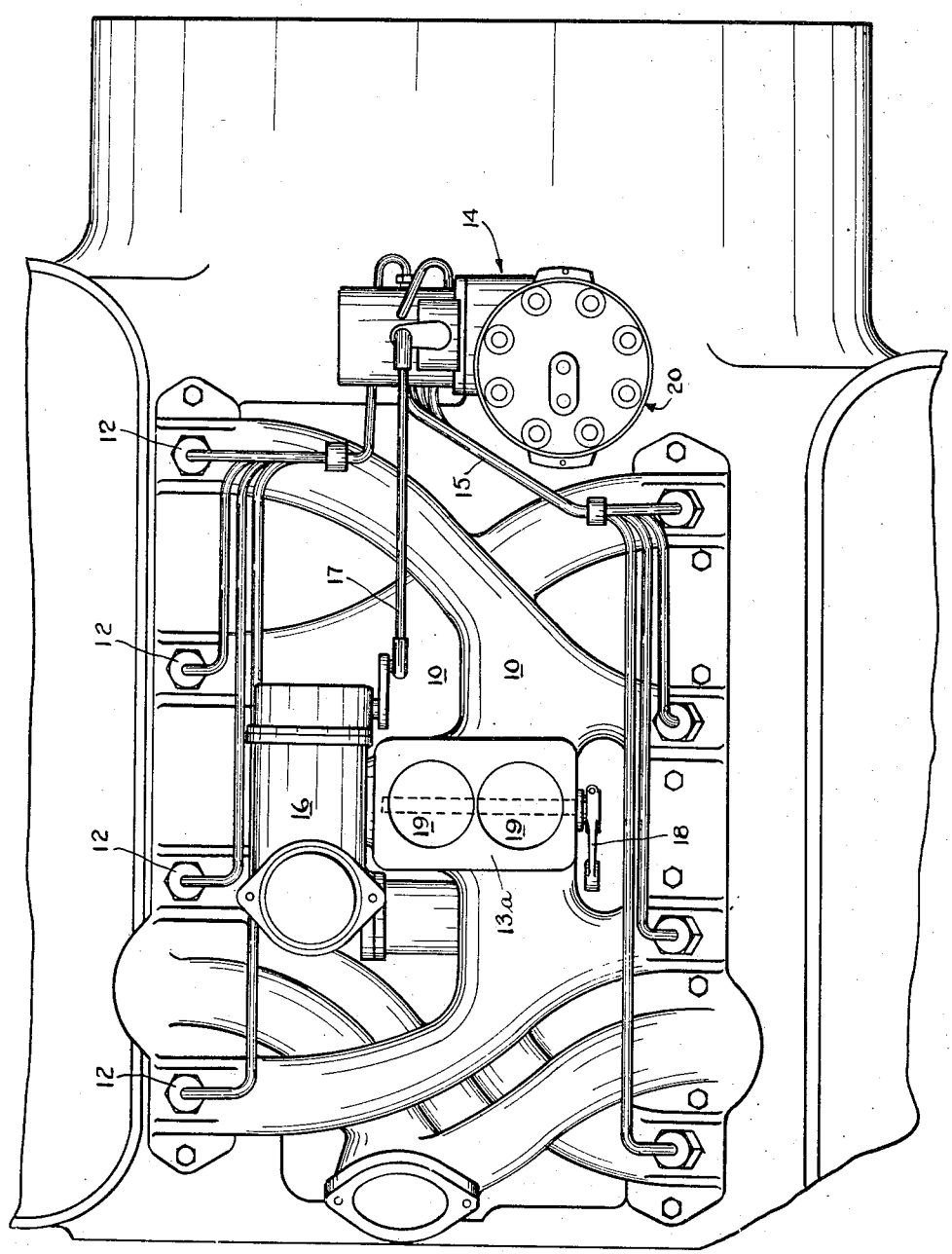
Fig. 2 is a fragmentary top or plan view of the engine shown in Fig. 1.

In the top or plan view shown in Fig. 2, will be seen the manifolds 10 and throttle body 13a. Also in this view, will be seen the combined ignition distributor and injection pump 14a which is connected by the lines 15 to various injection nozzles 12. Also in this figure, will be seen the mixture control 16 which is of the manifold density type and which is connected to the injection pump by the rod or ring 17 for automatically controlling the setting of the fuel quantity delivered by the pump relative to the air-fuel ration established by the pressure drop across the throttle body. The lever 18 for controlling the throttle body butterfly 19 is adapted to be controlled to the usual foot throttle for controlling the speed or load of the engine.

In the arrangement shown in Figs. 3 through 7, the combined ignition distributor and injection pump 14 embodies the conventional ignition distributor 20 adapted to be operated by the timer-driveshaft 21 which is adapted to be operatively connected to the engine in the usual manner.

In the present invention, however, the timer-driveshaft 21 is provided with gear 22 for driving the injection pump.

In the form of the invention shown, the gear 22 is secured on the driveshaft 21. It will be noted, however, that, if desired, the driveshaft 21 could be formed in separate parts allowing the ignition distributor to be formed completely separate from the remainder of the assembly and assembled therewith on the engine.

On the side of the base 23 of the ignition distributor 20 is secured the injection pump which is designated generally at 24 and which is operative to driveshaft 21 through shaft 25 on which is provided helical gear 26 for operable connection with gear 22 previously described.

Figure 3:
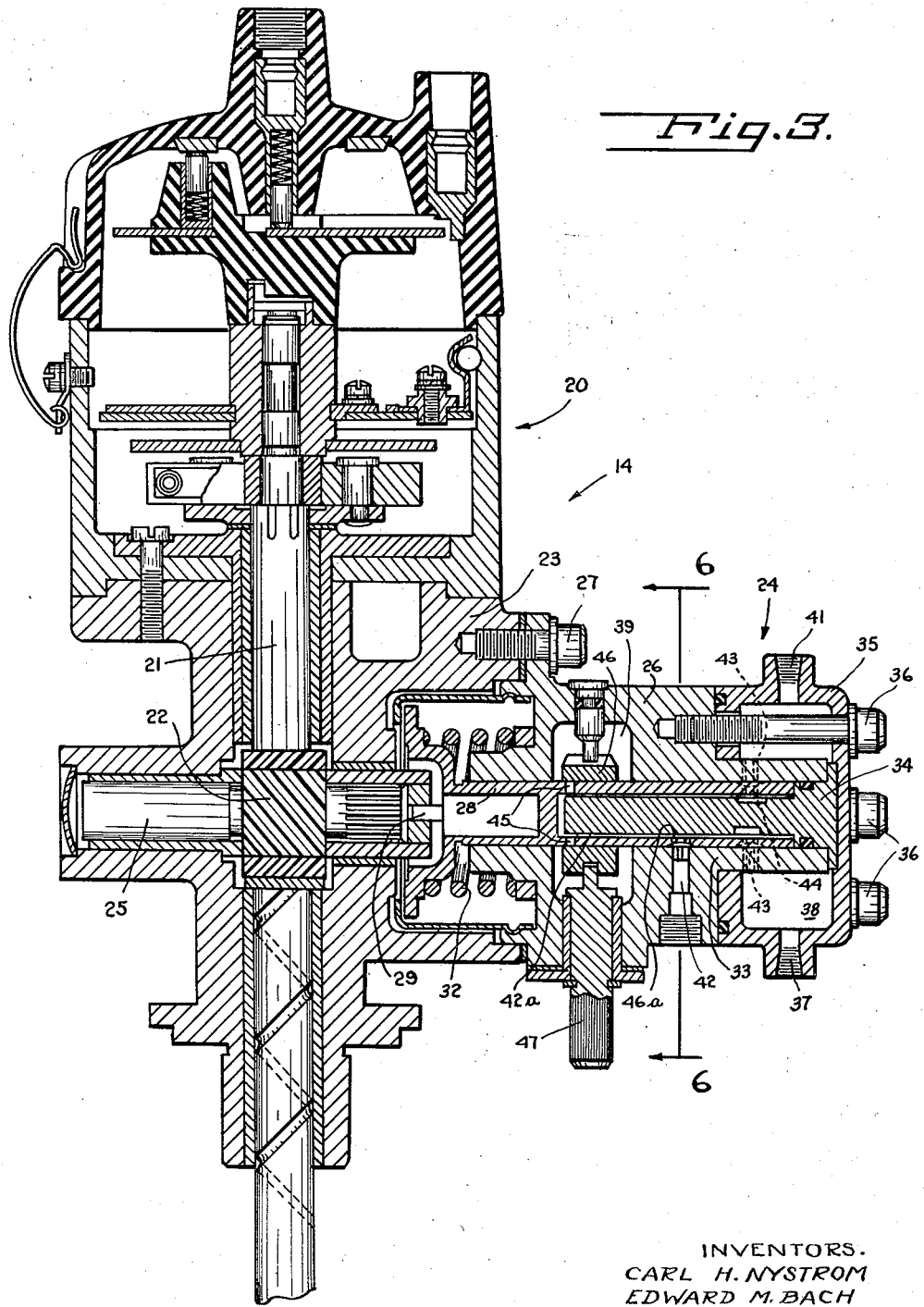
Fig. 3 is a sectional view of a combined fuel injection pump and ignition distributor for use in the present invention.

The pump housing 26 is adapted to be secured to distributor base 23 by means of screws or the like 27, as will be seen from Figs. 3 and 3a.

Within housing 26 is provided the pumping and distributing member 28 which is operatively connected by an Oldham connection or the like 29 to the adjacent end of shaft 25 whereby rotation of shaft 25 effects simultaneous rotation of member 28 and upon rotation of member 28, reciprocation thereof is effected through face-cam 30 on roller 31.

The return stroke of member 28 is effected by spring 32.

Member 28 has the hollow pumping and distributing portion 33 in which is positioned the stationary filler plug 34 which is carried by housing section 35 which is attached to housing section 26 by means of bolts or the like 36. Housing section 35 has the fuel inlet 37 adapted to be connected to a source of fuel such as a line from a fuel tank or a transfer pump, such as the usual engine fuel pump, if desired. Within housing section 35 is the sump 38 and within section 26 is the spill chamber 39 and spill chamber 39 is connected to sump 38 by means of suitable drill ports 40 for returning spilled or bypassed fuel to the pump inlet, and a check valve in the overflow port 41 controls the return of surplus fuel to the fuel source while regulating the fuel pressure within the pump, that is, to maintain a suitable fuel operating pressure within the pump.

The outlets 42 are provided one of which is connected to each of the lines 15 which is connected to its respective nozzle 12, as previously described.

The sump 38 is adapted to be connected to the pump bore 42a by means of the fill ports 43 one of which is provided for each outlet of the pump, for example, in the present instance the pump shown has eight outlets and accordingly eight fill ports are provided as well as eight outlets. The member 28 also has a corresponding number of fill ports 44 adapted to phase simultaneously with the fill ports 43 upon the section stroke of the pumping and distributing plunger member 28.

The member 28 also has a suitable number of bypass or spill ports or the like 45 adapted to be surrounded by the control sleeve 46 and which is adjusted by the shaft 47 to control the quantity of fuel spilled or bypassed by the pump, and thereby controlling the quantity of fuel injected.

The pumping and distributing plunger 28 has a single distributing port 46c adapted to communicate with each of the outlets 42 successively upon rotation and reciprocation of member 28.

In the form of the invention shown in Figs. 3a and 6a, the device is generally similar to that shown in Figs. 3 and 6 and previously described except that in this form of the invention, the separate spill chamber 39 and sump 38 are combined into a single chamber 48 and the fill ports 43 instead of being in the housing section are in the non-rotating sleeve 46b. As will be seen from Fig. 6a, the ports or ducts 40 are eliminated in this form of the invention and also because of the combining of the sump 38 with the chamber 39, the over-all length of the injection pump can be reduced and the pump construction considerably simplified and reduced in cost.

Figure 8:
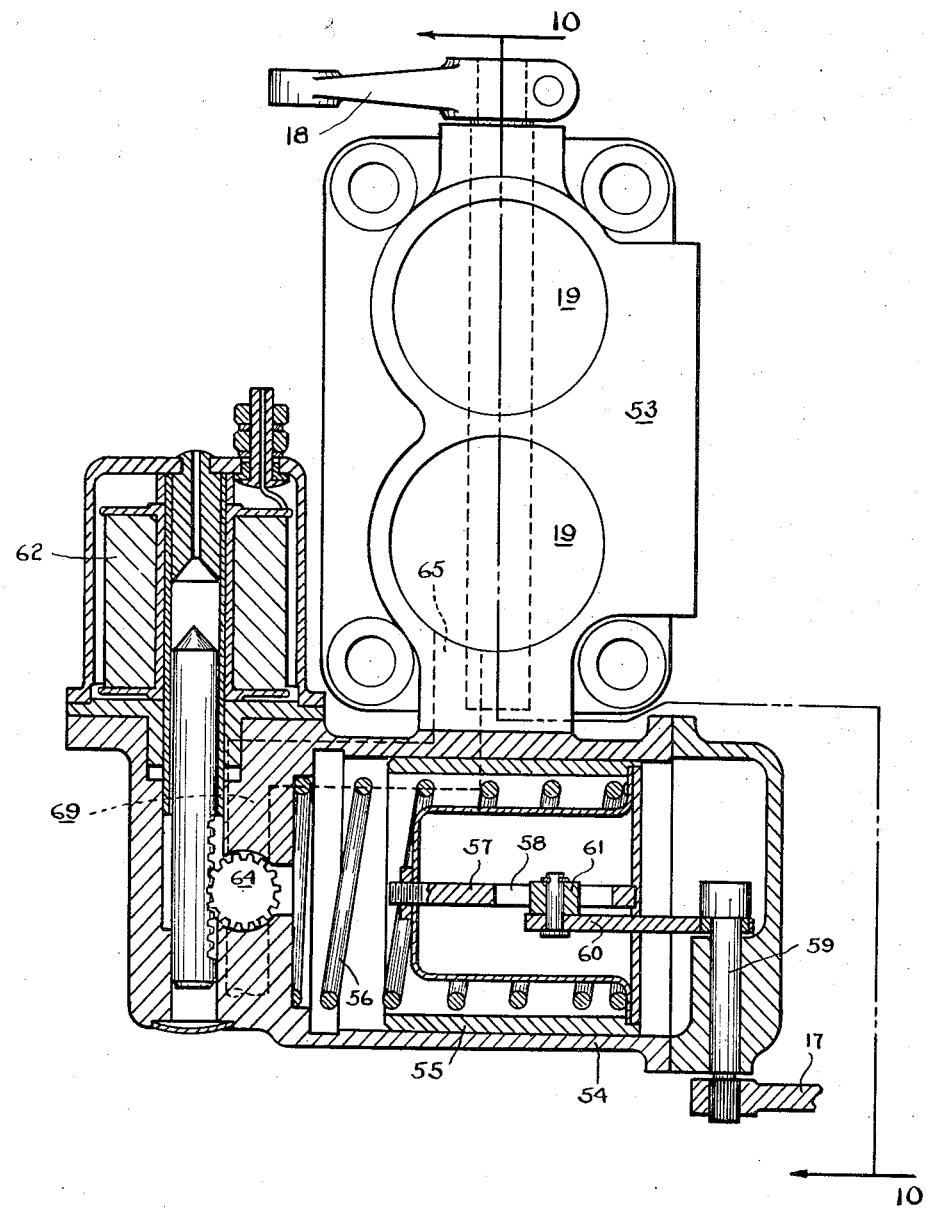
Fig. 8 is a plan view, partly in section, of one form of mixture control employed in the present system.
Figure 9:
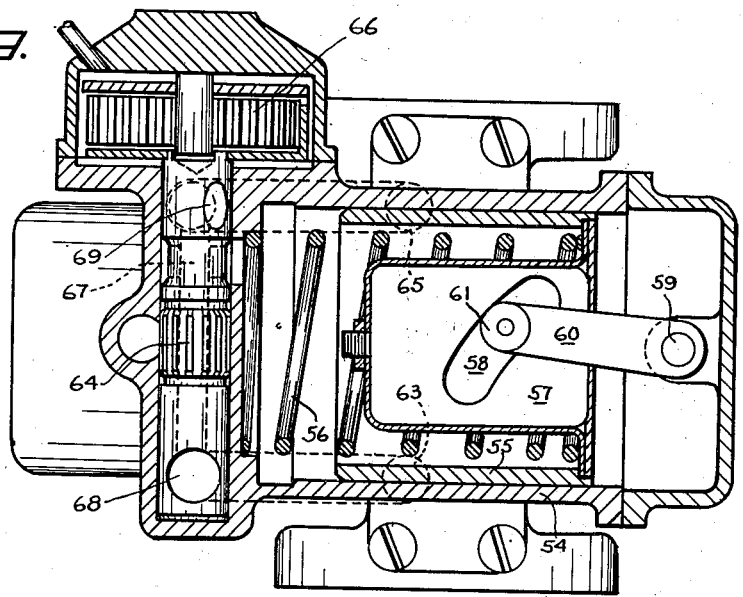
Fig. 9 is a sectional view taken along line 9—9 of Fig. 10, looking in the direction of the arrows.
Figure 10:
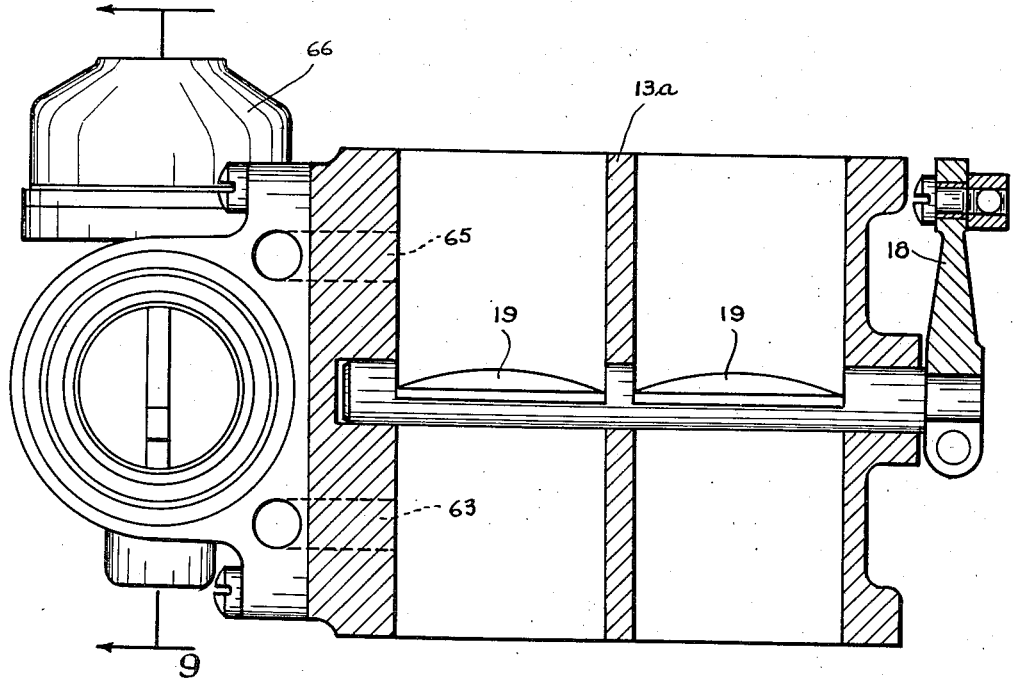
Fig. 10 is a sectional view taken on line 10—10 of Fig. 8, looking in the direction of the arrows.

The mixture control unit, in the form shown in Fig. 8, consists of cylinder 54 in which is mounted piston 55 which is adapted to be actuated by manifold depression through pressure drop across butterflies 19 which are adjusted by the throttle. For every throttle position, there is a corresponding manifold depression thus creating a definite fixed position of piston 55 which is controlled by the rate of spring 56.

To provide additional fuel at idle and at full load, cam 57 is provided which may be carried by piston 55 or otherwise positioned but should be operatively related to said piston 55.

Cam slot 58 can be varied according to the fuel-air mixture ratio desired.

Rod 17 is connected to the fuel injection pump quantity control as previously stated. This rod is rigidly connected to shaft 59 which in turn is rigidly connected to cam link 60 having cam roller 61 in cam slot 58 whereby movement of piston 55 in cylinder 54 effects a corresponding pivotal movement of lever 17 and thereby controls the quantity of fuel delivered by the pump.

To provide extra fuel for starting, the solenoid 62 is provided which temporarily blocks passage 63 by rotating valve 64 thus allowing above throttle pressure to enter cylinder 54 through passage 65 and this pressure maintains full load fuel delivery of the pump, which is accomplished through maintaining the piston in full fuel quantity position.

The solenoid operates as above during the energization of the starter.

When the starter is released and during warm-up period of the engine, the thermostatic or bimetallic spring 66 maintains valve 64 in almost the same position in which the valve was set by solenoid 62 but allows a partial bleeding of air through port or passage 63 allowing the piston 55 to move gradually toward a position to set the pump at the normal fuel-air mixture ratio.

As the engine continues to warm up, the thermostatic member 66 slowly rotates until port 65 is completely closed and port 63 is opened to cylinder 54 for normal operation of the engine.

Valve 64 has an axial passage and radial ports 68 and 69 adapted to be aligned with passages 63 and 65 respectively. Ports 68 and 69 function as rotary valves and are so phased as to allow slight overlapping during the transition from one to the other but otherwise one is in complete register and the other is completely out of register.

Figure 11:
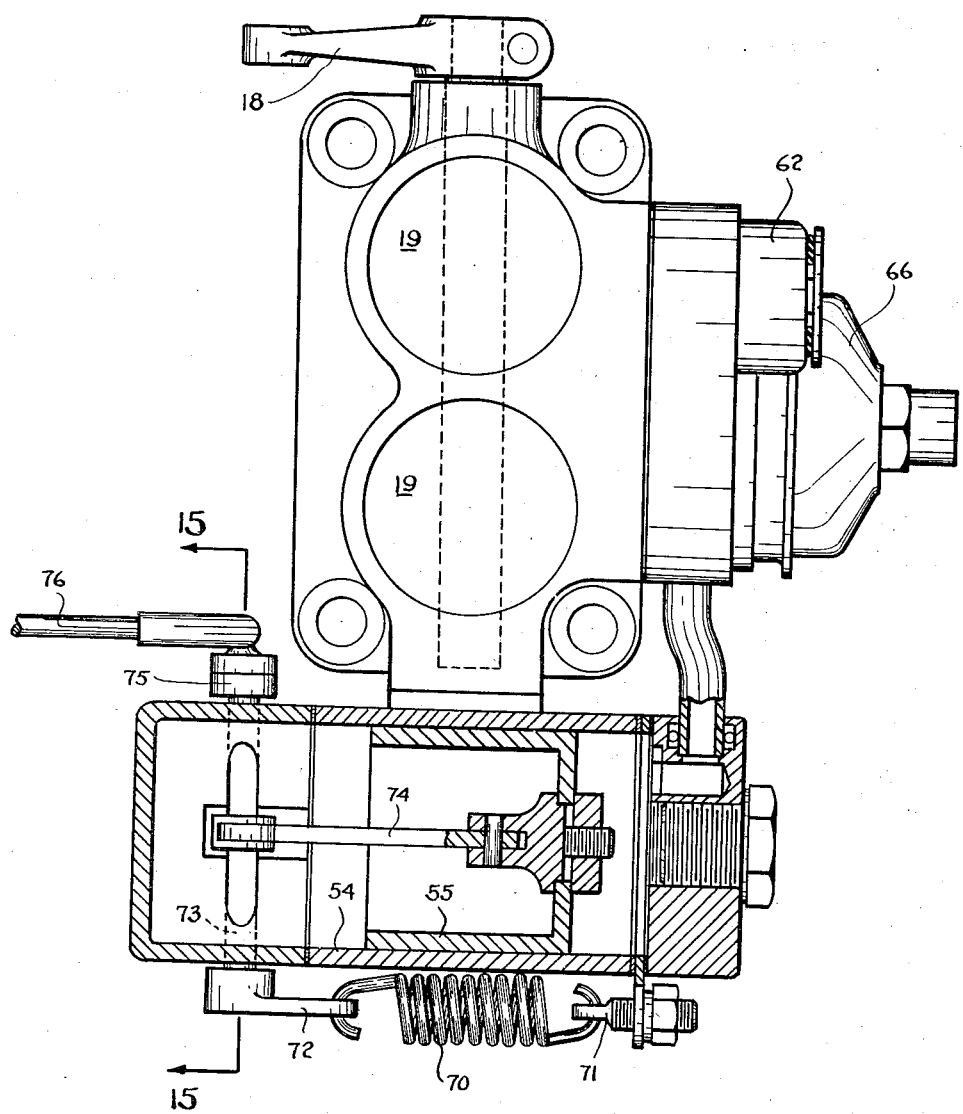
Fig. 11 is a view similar to Fig. 8, but showing a modified form of mixture control apparatus similar to that of Fig. 14.
Figure 14:
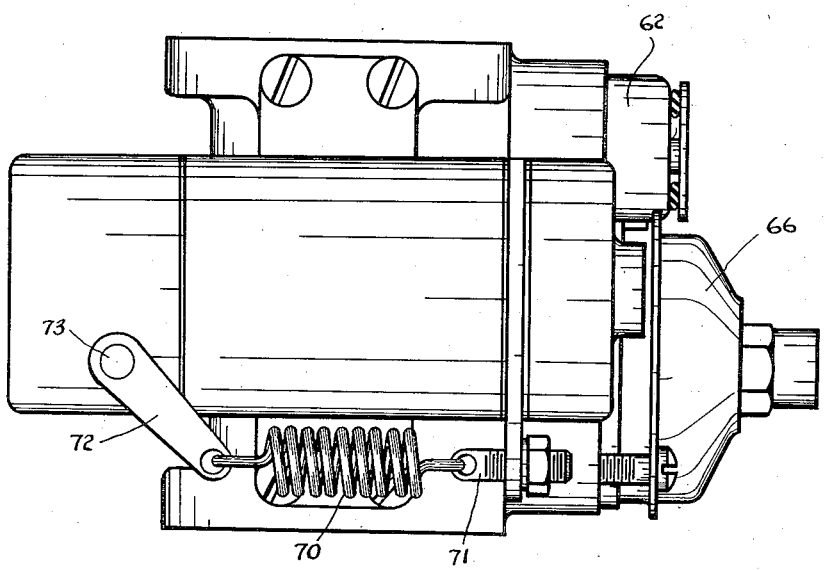
Fig. 14 is a side view of another form of mixture control apparatus.
Figure 15:
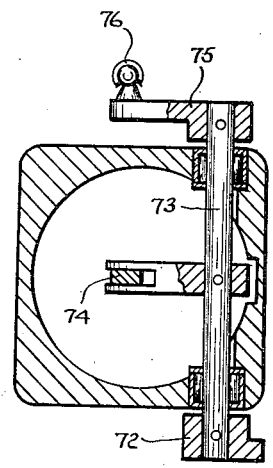
Fig. 15 is a sectional view taken on line 15—15 of Fig. 11, looking in the direction of the arrows.

In the form of mixture control shown in Figs. 11 and 14, a solenoid arrangement is provided for starting and the thermostatic element 66, previously described, is also employed.

In this form of the invention, an external spring 70 is employed in place of the spring 56. Spring 56 is a constant rate spring whereas spring 70 is a variable rate spring. In this form, the spring 70 is connected at one end to the connector 71 which allows adjustment of the pre-load on spring 70 and the opposite end of spring 70 is connected to pivotable lever 72 on the end of shaft 73 which shaft is connected through lever 74 to cylinder 55. On the opposite end of shaft 73 is provided the pivotable lever 75 which is connected by rod 76 to the fuel control of the injection pump.

It will thus be seen that as the shaft 73 is rotated, the adjustment or movement of piston 55 in cylinder 54 rotates shaft 73 which thereby effects adjustment of the fuel quantity control of the injection pump through rod 76 and simultaneously lever 72 is pivoted to vary the rate of spring 70, and thus alters the relative movement of piston 55 relative to rod 76.

Figure 13:
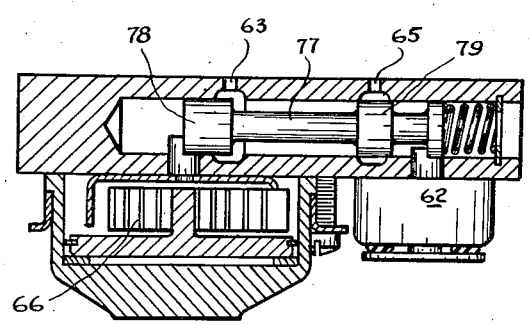
Fig. 13 is a sectional view taken on line 13—13 of Fig. 12, looking in the direction of the arrows.

In this form of the invention, the thermostatic member and solenoid are shown in section in Fig. 13 and both are adapted to actuate valve 77 which is adjustable longitudinally and which has the land portions 78 and 79 for controlling the passage of air through passages 63 and 65.

Figure 12:
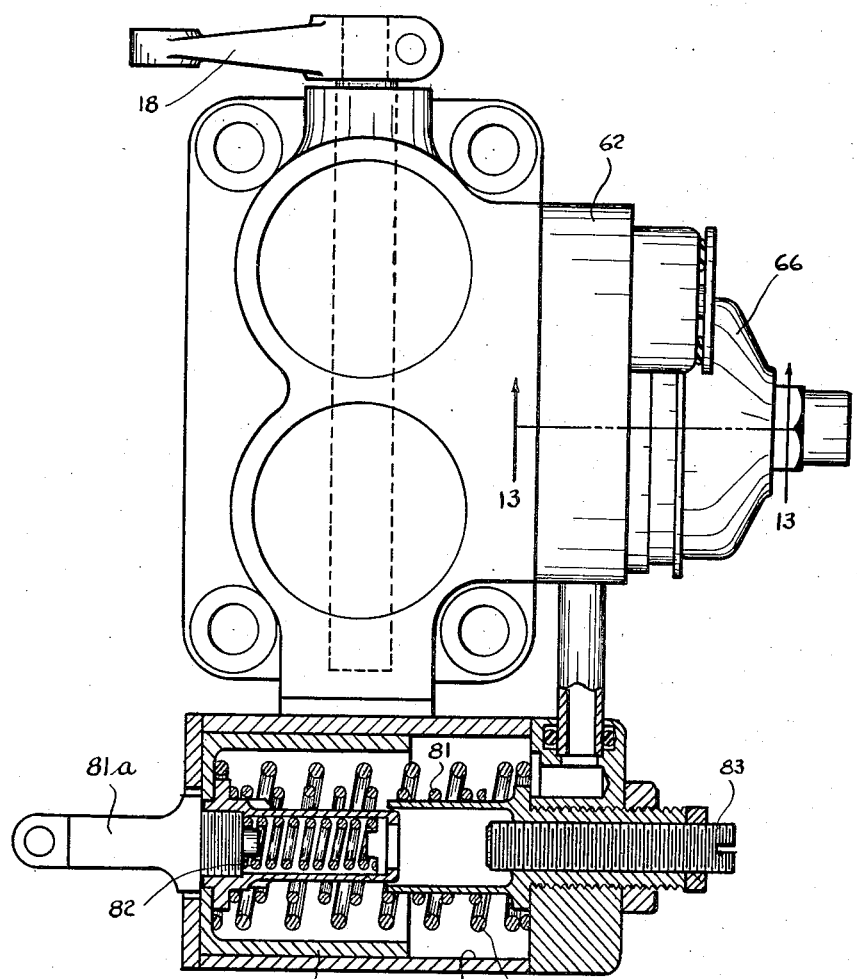
Fig. 12 is a sectional view similar to Figs. 8 and 11, but showing another form of mixture control apparatus.

In the form of mixture control shown in Fig. 12, instead of having the external variable rate spring 70 or the cam 57, a plurality of springs 80, 81 and 82 are employed.

In this form of the invention, the member 81a is connected directly to the fuel quantity control of the injection pump and this member 81a is connected directly to the piston 55 as shown in Fig. 12.

In this form of the invention, the spring 80 is for full power enrichment and the inner springs 81 and 80 together control the rate of the piston movement during normal operation and spring 82 is for idle enrichment. Adjustable stop 83 controls the idle spring.

In this form of the invention, the same solenoid 62 and thermostatic member 66 arrangement, as shown in Fig. 13, is employed.

Figure 16:
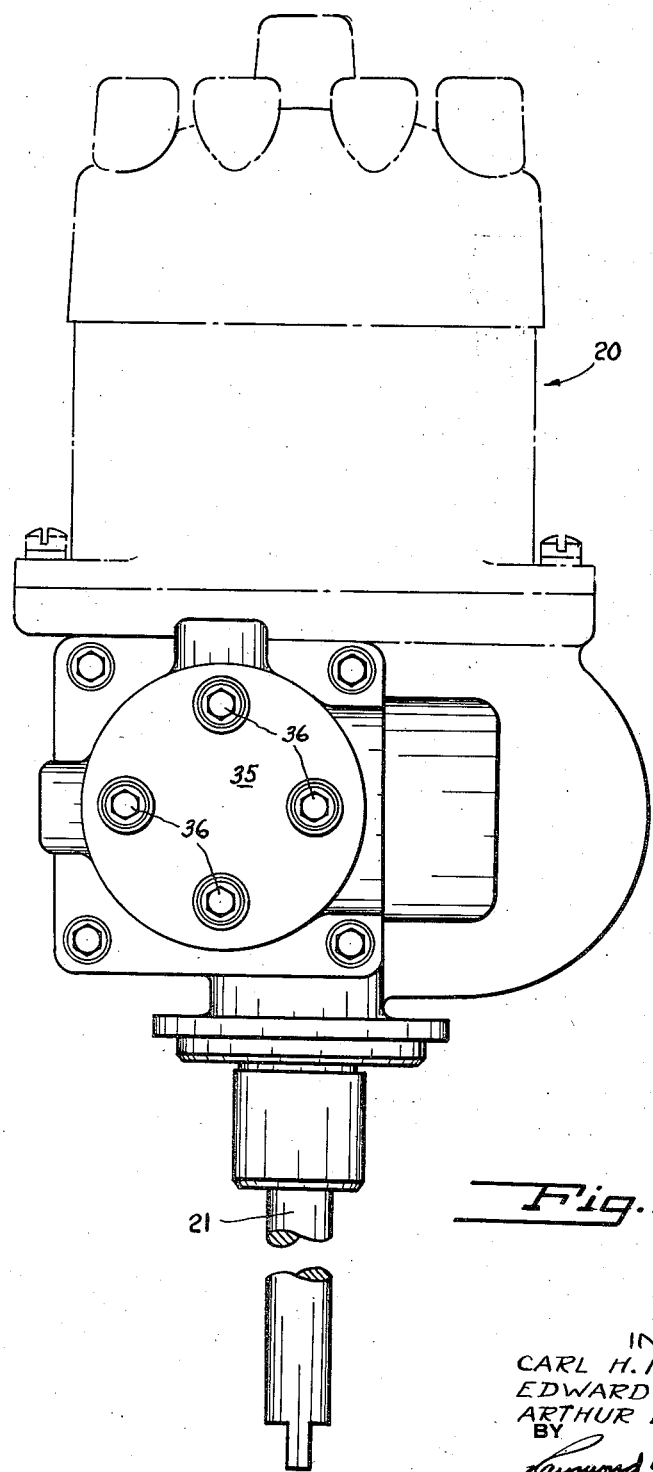
Fig. 16 is a side view of another form of combined fuel injection pump and ignition distributor wherein the mixture control is also combined with the injection pump.

In the form of the invention shown in Figs. 16 and 17, the manifold pressure chamber of the mixture control apparatus is combined with the injection pump and connected to the throttle body by tube 85. This system allows the placing of the throttle body and injection pump at any desired point.

In this form of the invention, the multiple spring arrangement, previously described in connection with the form of the invention of Fig. 12, is employed except that diaphragm 86 is employed instead of piston 55 and member 81a is connected to the quantity control 87 of the injection pump through the linkage arrangement 88 which comprises the levers 89 and 90 which are connected to a pivoted member 91 which is pivoted about point 92. With this system, movements of member 81a are reduced to provide smaller movements of the fuel pump quantity control 87 upon movement of member 81a.

The operation of the device is believed apparent from the foregoing description.

From the above, it will be seen that we have provided new and improved means for obtaining all of the objects and advantages of the invention.

We claim:

1. Control means for use with a fuel injection system for injecting fuel into the combustion chambers of an internal combustion engine having a throttle body and comprising a fuel injection pump, means for delivering fuel from said injection pump succcessively to the combustion chambers of said engine, said control means including means for controlling the quantity of fuel delivered to each of said combustion chambers, said means comprising a mixture control operatively connected to the throttle body of the engine and actuated by manifold pressure, said mixture control comprising a cylinder, a piston in said cylinder, a member actuated by said piston and operatively connected to said injection pump for adjusting the fuel control of said pump according to the position of said piston and a cam member operatively connected to said piston member and to the said control for said injection pump for controlling the fuel quantity delivered by the pump and thereby controlling the fuel/air ratio and a control valve for controlling the air reaching said cylinder from said throttle body and means for actuating said control valve to provide additional fuel for starting the engine.

2. Control means for use with a fuel injection system for injecting fuel into the combustion chambers of an internal combustion engine having a throttle body and comprising a fuel injection pump, means for delivering fuel from said injection pump successively to the combustion chambers of said engine, said control means including means for controlling the quantity of fuel delivered to each of said combustion chambers, said means comprising a mixture control operatively connected to the throttle body of the engine and actuated by manifold pressure, said mixture control comprising a cylinder, a piston in said cylinder, a member actuated by said piston and operatively connected to said injection pump for adjusting the fuel control of said pump according to the position of said piston and a cam member operatively connected to said piston member and to the said control for said injection pump for controlling the fuel quantity delivered by the pump and thereby controlling the fuel/air ratio and a control valve for controlling the air reaching said cylinder from said throttle body and means for actuating said control valve to provide additional fuel for starting the engine and a thermostatically controlled member operatively connected to said fuel control and modifying the setting of said valve by manifold pressure according to engine temperature.

References Cited in the file of this patent

UNITED STATES PATENTS

| | | |
|---|---|---|
| 2,245,562 | Becker | June 17, 1941 |
| 2,455,571 | Edwards | Dec. 7, 1948 |
| 2,542,389 | Broderick | Feb. 20, 1951 |
| 2,624,284 | Straub | Jan. 6, 1953 |
| 2,624,327 | Hogeman | Jan. 6, 1953 |
| 2,667,840 | High | Feb. 2, 1954 |

FOREIGN PATENTS

| | | |
|---|---|---|
| 869,871 | France | Nov. 27, 1941 |